(12) United States Patent
Dorn et al.

(10) Patent No.: US 9,291,247 B2
(45) Date of Patent: *Mar. 22, 2016

(54) ROLLER TAPPET

(71) Applicant: Schaeffler Technologies AG & Co. KG, Herzogenaurach (DE)

(72) Inventors: Stefan Dorn, Hollfeld (DE); Norbert Geyer, Hoechstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 147 days.

This patent is subject to a terminal disclaimer.

(21) Appl. No.: 13/765,234

(22) Filed: Feb. 12, 2013

(65) Prior Publication Data
US 2013/0213181 A1 Aug. 22, 2013

(30) Foreign Application Priority Data

Feb. 20, 2012 (DE) .......................... 10 2012 202 568

(51) Int. Cl.
*F01L 1/14* (2006.01)
*F16H 53/06* (2006.01)
*F02M 59/10* (2006.01)
*F04B 1/04* (2006.01)

(52) U.S. Cl.
CPC . *F16H 53/06* (2013.01); *F01L 1/14* (2013.01); *F02M 59/102* (2013.01); *F04B 1/0408* (2013.01); *F04B 1/0426* (2013.01); *Y10T 74/2107* (2015.01)

(58) Field of Classification Search
CPC ............ F01L 1/12; F01L 1/14; F01L 1/2405; F01L 1/245; F01L 13/0031
USPC .............. 74/569, 567, 559; 123/90.48–90.59, 123/90.6, 90.39, 90.16
See application file for complete search history.

(56) References Cited

U.S. PATENT DOCUMENTS

| 5,239,951 | A | * | 8/1993 | Rao et al. ..................... 123/90.5 |
| 5,273,005 | A | * | 12/1993 | Philo et al. ................... 123/90.5 |
| 5,676,098 | A | * | 10/1997 | Cecur .......................... 123/90.5 |
| 8,104,442 | B2 | * | 1/2012 | Dorn et al. ................. 123/90.48 |
| 8,800,519 | B2 | * | 8/2014 | Dorn et al. ................. 123/90.48 |
| 2008/0190237 | A1 | * | 8/2008 | Radinger et al. ............... 74/569 |
| 2010/0012065 | A1 | * | 1/2010 | Dorn et al. ................. 123/90.48 |
| 2010/0064844 | A1 | * | 3/2010 | Pflugl ............................. 74/569 |
| 2010/0229812 | A1 | * | 9/2010 | Dorn et al. .................. 123/90.5 |

FOREIGN PATENT DOCUMENTS

| DE | 102010022318 | 12/2011 |
| WO | WO 2011064044 A1 * | 6/2011 |
| WO | 2011/151108 | 12/2011 |

* cited by examiner

Primary Examiner — Daniel Yabut
(74) Attorney, Agent, or Firm — Simpson & Simpson, PLLC

(57) ABSTRACT

A roller tappet intended for use a) in a high pressure fuel pump; b) in a valve train of an internal combustion engine; c) in an engine such as an axial piston engine or a radial piston engine; or d) generally for a pump/compressor of an axial piston type or of a radial piston type.

8 Claims, 1 Drawing Sheet

ROLLER TAPPET

CROSS-REFERENCE TO RELATED APPLICATIONS

This application claims priority from German Patent Application No. 10 2012 202568.5 filed Feb. 20, 2012, which application is incorporated herein by reference in its entirety.

FIELD OF THE INVENTION

The invention concerns a roller tappet having a housing. Near a drive side front end of the housing, two diametrically opposing flats receding from an outer wall of the housing are arranged, each of the two flats comprising a reception with a U-like shape open in a direction towards the drive side front end, a pin being mounted in the receptions, a roller serving as a run-on surface of a periodic stroke producer being mounted through a bearing means on the pin, a support for a tappet follower element being seated on a driven side end of the housing, and a retention means being provided for the pin in an axial direction of the pin for preventing the pin from exiting axially out of the housing.

BACKGROUND OF THE INVENTION

A roller tappet of the pre-cited type, for example, for a high pressure fuel pump of a quality or quantity regulated type internal combustion engine is described in DE 10 2010 022 318 A1. A retention means for the pin for preventing its exit out of the housing is created through its encompassment over more than 180° in the receptions of the flats. At the same time, the pin runs with its front ends on inner sides of an upper belt zone of the housing so that a further retention means is created (see FIG. 4).

A drawback of the aforesaid configuration is that, during snapping-in of the pin into its reception, a plastic deformation of its thin-walled sheet material, and surface damage, can occur. Depending on the circumstances, if the encompassment of the pin is inadequate, this type of securing can also come apart. Moreover, it is to be noted that the pin runs with its front ends only through two edge regions on the inner sides of the belt of the housing, and this can likewise lead to wear. At the same time, it is only with some difficulty that the axial lash of the pin can be adjusted. In addition, the bearing means for the pin extends on a relatively small diameter, so that, under certain circumstances, the bearing arrangement reaches its load bearing limits prematurely.

BRIEF SUMMARY OF THE INVENTION

It is therefore an object of the invention to provide a retention means with a simple structure for a roller pin in a tappet.

The invention achieves the above object by the fact that the pin has a stepped configuration and comprises a central section of a large diameter that carries the roller, and two end annular shoulders of a small diameter, a finger projects inwards up to a point directly in front of the corresponding annular shoulder from an upper transverse side of a respective window of the housing that frames each one of the two flats, so that the retention means for the pin against exiting in axial direction out of the housing is formed, and the pin, for forming a retention means of the pin in the axial direction of the pin, comes to run up to a point directly in front of an inner side of the respective flat through an annular step that is formed between the central section of the pin and the respective annular shoulder.

In this way, the above mentioned wear as also the danger of deformation of the tappet material in the region of the reception is minimized or even excluded. By reason of this running of the pin in the axial direction on the inner sides of the flats, the potential contact surface is also enlarged. At the same time, the stepped configuration of the pin enables an enhancement of the load bearing capacity of the bearing due to the thus created enlargement of the central section of the pin that carries the roller.

A particularly simple configuration of the receptions in the housing is the subject matter of a further dependent claim. According to this claim, the side walls of the receptions have a smooth surface so that a "loose" insertion of the pin is enabled.

According to a further feature of the invention, the front ends of the bearing means of the roller form a flush junction with the annular steps of the pin so that a simple lateral run-on of the bearing means onto the inner sides of the flats is likewise enabled. A suitable bearing means for the roller is a rolling bearing such as a needle roller bearing or a sliding bearing, or combinations of these.

The finger, which is simple to attach and projects preferably integrally from the window, is incised without chip removal and bent slightly in direction of the tappet interior. This finger thus replaces the prior art encompassment of the pin in the region of the receptions.

It is understood that the retention means can also be configured such that a slight movability of the pin is preserved in the axial direction of the pin and also in the longitudinal direction of the housing.

According to a further development of the invention, it is proposed to configure the outer wall of the housing between the upper transverse sides of the two windows comprising the fingers, together with the drive side front end, in form of a smooth-faced, closed continuous ring. Moreover, an optimal junction is created for the finger projecting onto the pin, which finger may alternatively also project inwards from the side walls of each window and/or be made as a separate component.

The receding flats with the receptions are preferably connected integrally to the housing and are generated, for example, by a rudimentary stamping of a wall region of the housing radially in the inward direction.

The roller tappet is preferably used as a cam follower or eccentric follower in a high pressure fuel pump, in a direct or indirect valve train of an internal combustion engine, or in an axial or radial piston engine, or in a pump of this type.

BRIEF DESCRIPTION OF THE SEVERAL VIEWS OF THE DRAWING

The invention will now be described more closely with reference to the appended drawing, where.

DETAILED DESCRIPTION OF THE INVENTION

Figure 1:
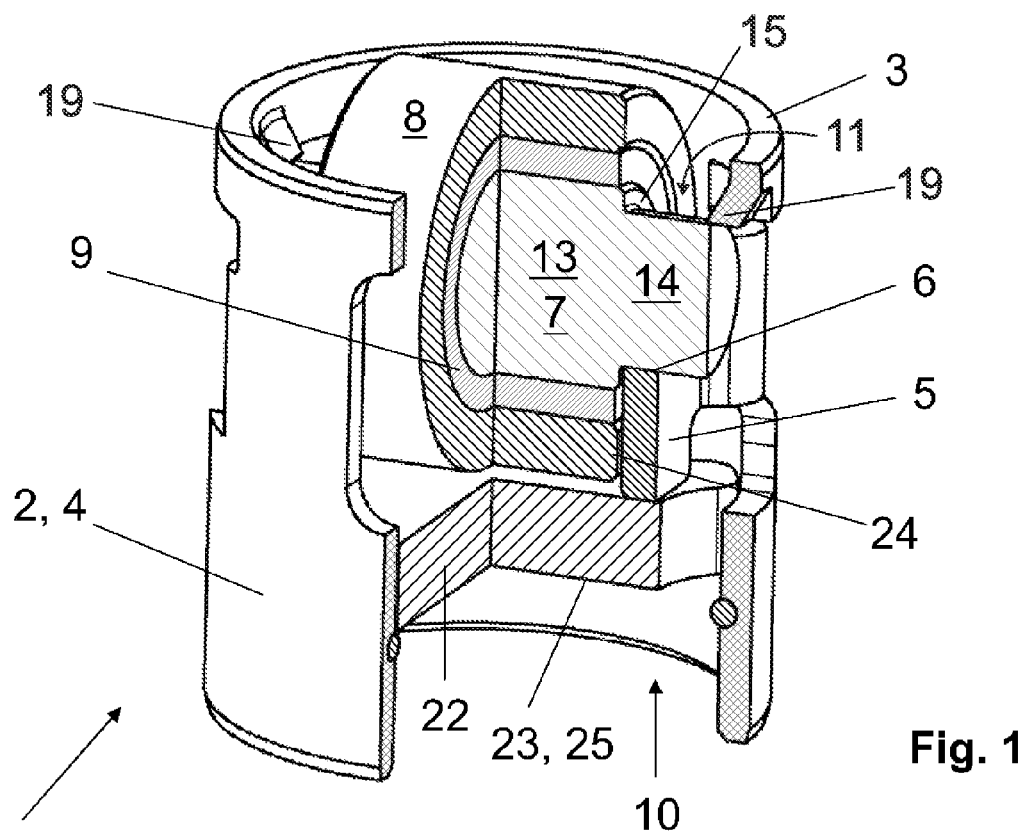
FIG. 1 is a three dimensional view of a roller tappet.
Figure 2:
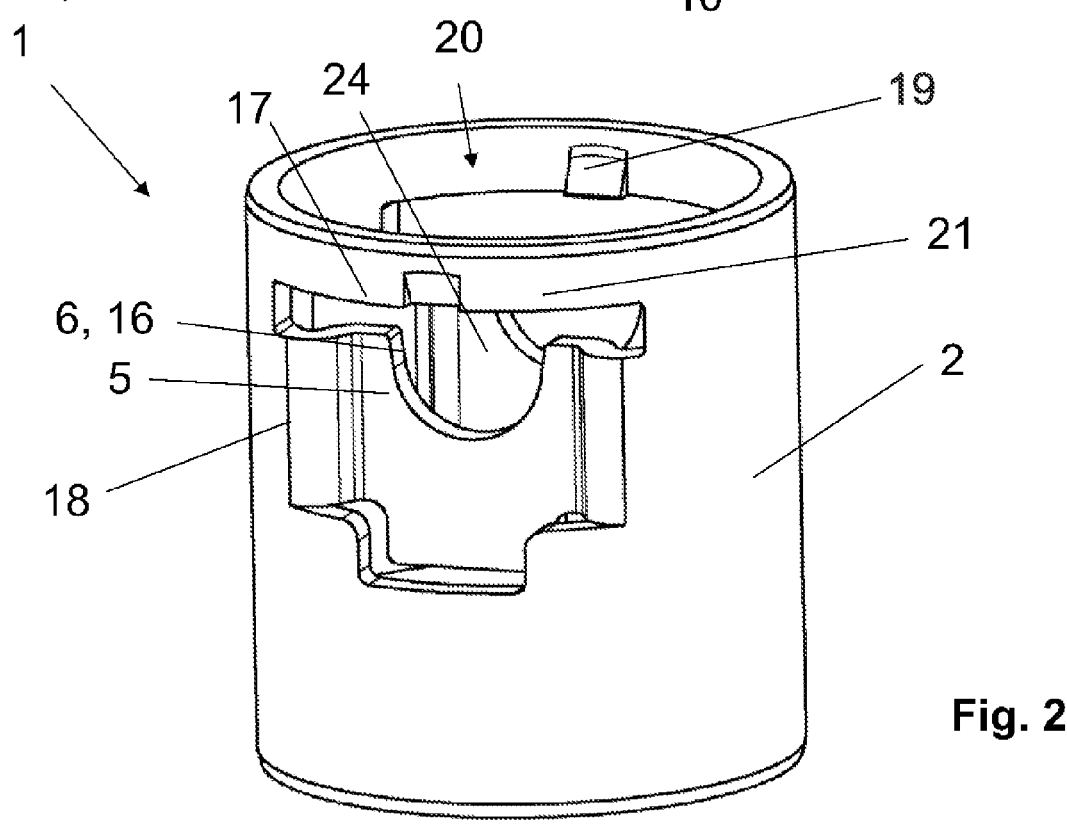
FIG. 2 is a three dimensional view of the housing of the roller tappet, rotated relative to the view of FIG. 1.

FIG. 1 discloses a roller tappet 1 comprising a housing 2 made out of thin-walled sheet steel, in the present case, for a high pressure fuel pump. In the vicinity of a drive side front end 3 of the roller tappet 1 are situated two opposing flats 5 that recede integrally from an outer wall 4 of the housing 2 while comprising, each one, a reception 6 having a U-like shape that is open in the direction of the drive side front end 3. A pin 7 is mounted in the receptions 6. A roller 8 serving as a run-on surface of a cam or an eccentric being mounted through a bearing means 9 on said pin 7. The bearing means is a needle roller bearing or a sliding bearing or a combination of these.

A support 25 for a pump piston extends near a driven side front end 10 of the roller tappet 1 axially below the roller 8. This support 25 is situated on an underside 23 of a separate bridge member 22 that extends through the housing 2.

The invention further provides retention means 11 of a simple structure for the aforesaid pin 7 in the axial direction of the pin 7 and in the receptions 6 of the pin 7 for preventing the pin 7 from exiting axially out of the housing 2.

For this purpose, the pin 7 comprises a central section 13 of a large diameter for carrying the roller 8 and, on each of its two ends, an annular shoulder 14 of a smaller diameter than that of the central section 13, which annular shoulders 14 are seated in the receptions 6. In this way, an annular step 15 is formed between the central section 13 and each annular shoulder 14. To be seen at the same time is that lateral arms 16 of the receptions 6 are smooth-faced and straight-walled and thus surround the pin 7 at the most over 180°. In the final analysis, this pin 7 lies "loosely" in the receptions 6.

Both figures show that a finger 19 projects integrally from an upper transverse side 17 of each window 18 of the housing 2 near the respective flat 5 into the tappet interior 20. The transverse side 17 is part of a smooth walled closed, continuous ring 21 of the housing 2, which continuous ring 21 possesses an outer diameter that is equal to the diameter of the housing 2 and is an integral part of the housing 2.

The aforesaid finger 19 is slightly stamped and bent inwards. The finger 19 extends directly in front of the outer wall of the annular shoulder 14 of the pin 7. Through this measure, the pin 7 is retained from exiting axially out of the housing 2, i.e., in a direction towards the drive side front end 3 of the housing 2.

It can be seen further that the pin 7, through the annular step 15 between the central section 13 of the pin 7 and the respective annular shoulder 14, extends directly in front of an inner side 24 of the respective flat 5, so that the pin 7 is given a retention with slight lash in its axial direction.

LIST OF REFERENCE NUMERALS

1 Roller tappet
2 Housing
3 Front end on drive side
4 Outer wall
5 Flat
6 Reception
7 Pin
8 Roller
9 Bearing means
10 Driven side front end
11 Retention means
12 not used
13 Central section
14 Annular shoulder
15 Annular step
16 Lateral arm
17 Transverse side
18 Window
19 Finger
20 Tappet interior
21 Continuous ring
22 Bridge member
23 Underside
24 Inner side
25 Support

What we claim is:

1. A roller tappet (1), comprising:
   a housing (2) having:
      an outer wall (4);
      a drive side front end (3);
      a driven side front end (10);
      two diametrically opposing flats (5) receding from the outer wall (4) proximate said drive side front end (3), each of said two flats (5) comprising a U-shaped reception (6) open in a direction towards the drive side front end (3), and framed by a respective window (18);
      a plurality of fingers (19) projecting inwards; and,
   a pin (7) mounted in said receptions (6), the pin having:
      a bearing means (9);
      a central section (13) of a large diameter; and,
      two annular shoulders (14) of a small diameter;
   a roller (8) serving as a run-on surface of a periodic stroke producer being mounted through the bearing means (9) on said pin (7);
   a support (25) for a tappet follower element being seated on the driven side front end (10) of the housing (2); and,
   a retention means (11) being provided for the pin (7) in an axial direction of the pin (7) for preventing the pin (7) from exiting axially out of the housing (2);
   wherein the central section (13) of the pin (7) carries the roller (8) and extends to a point directly in front of an inner side (24) of the two diametrically opposing flats (5), and the retention means are formed by the fingers (19) projecting inward up to a point directly in front of a corresponding annular shoulder of the annular shoulders (14) from an upper transverse side (17) of the respective windows (18) of the housing (2).

2. The roller tappet as recited in claim 1, wherein the receptions (6) have lateral sides (16) extending in an axial direction of the tappet (1), and are straight.

3. The roller tappet as recited in claim 1, wherein two annular steps (15) are formed between the two annular shoulders (14) and the central section (13) of the pin (7), and the bearing means (9) of the roller (8) has ends that are flush with the annular steps (15) of the pin (7).

4. The roller tappet as recited in claim 1, wherein the bearing means (9) comprises at least one needle roller bearing or sliding bearing or a combination of a needle roller bearing and a sliding bearing.

5. The roller tappet as recited in claim 1, wherein the outer wall (4) of the housing (2) between the upper transverse sides (17) of the two windows (18) comprising the fingers (19) is configured as a closed continuous ring (21).

6. The roller tappet as recited in claim 1, wherein the flats and the fingers are integral with the housing, and the housing (2) is made out of thin-walled sheet steel.

7. The roller tappet as recited in claim 1, wherein the fingers (19) protrude as incised material integrally from the transverse sides (17) of the fingers (19) and are bent inwards into a tappet interior (20).

8. The roller tappet recited in claim 1, wherein the roller tappet (1) is intended for use a) in a fuel pump; b) in a valve train of an internal combustion engine; c) in an engine such as an axial piston engine or a radial piston engine; or d) for a pump/compressor of an axial piston type or of a radial piston type.

* * * * *